(12) United States Patent
Meyerzon et al.

(10) Patent No.: US 8,082,246 B2
(45) Date of Patent: *Dec. 20, 2011

(54) SYSTEM AND METHOD FOR RANKING SEARCH RESULTS USING CLICK DISTANCE

(75) Inventors: Dmitriy Meyerzon, Bellevue, WA (US); Hugo Zaragoza, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/828,508

(22) Filed: Jul. 1, 2010

(65) Prior Publication Data

US 2010/0268707 A1    Oct. 21, 2010

Related U.S. Application Data

(63) Continuation of application No. 10/955,983, filed on Sep. 30, 2004, now Pat. No. 7,761,448.

(51) Int. Cl.
*G06F 17/30* (2006.01)
(52) U.S. Cl. ........................... 707/726; 707/722
(58) Field of Classification Search .................. None
See application file for complete search history.

(56) References Cited

U.S. PATENT DOCUMENTS

| | | | |
|---|---|---|---|
| 5,222,236 A | 6/1993 | Potash et al. |
| 5,257,577 A | 11/1993 | Clark |
| 5,594,660 A | 1/1997 | Sung et al. |
| 5,606,609 A | 2/1997 | Houser et al. |
| 5,848,404 A | 12/1998 | Hafner et al. |
| 5,893,092 A | 4/1999 | Driscoll |
| 5,920,859 A | 7/1999 | Li |
| 5,933,851 A | 8/1999 | Kojima |
| 5,960,383 A | 9/1999 | Fleisher |
| 5,983,216 A | 11/1999 | Kirsch et al. |
| 5,987,457 A | 11/1999 | Ballard |
| 6,006,225 A | 12/1999 | Bowman et al. |
| 6,012,053 A | 1/2000 | Pant et al. |
| 6,032,196 A | 2/2000 | Monier |
| 6,041,323 A | 3/2000 | Kubota |
| 6,070,158 A | 5/2000 | Kirsch et al. |

(Continued)

FOREIGN PATENT DOCUMENTS

DE    10029644 A1    1/2002

(Continued)

OTHER PUBLICATIONS

Chen et al, "Cha Cha: A System for Organizing Intranet Search Results", Computer Science Department, University of California, Berkeley, 1999, p. 1-12.*

(Continued)

*Primary Examiner* — Apu Mofiz
*Assistant Examiner* — Hung D Le
(74) *Attorney, Agent, or Firm* — Merchant & Gould P.C.

(57) ABSTRACT

Search results of a search query on a network are ranked according to an additional click distance property associated with each of the documents on the network. The click distance is measurement of the number clicks or user navigations from a page or pages on the network designated as highest authority or root pages on the network. The precision of the results is increased by the addition of the click distance term when the site or intranet where the search query takes place is hierarchically structured.

18 Claims, 6 Drawing Sheets

U.S. PATENT DOCUMENTS

| | | | |
|---|---|---|---|
| 6,070,191 A | 5/2000 | Narendran et al. |
| 6,098,064 A | 8/2000 | Pirolli et al. |
| 6,125,361 A | 9/2000 | Chakrabarti et al. |
| 6,128,701 A | 10/2000 | Malcolm et al. |
| 6,145,003 A | 11/2000 | Sanu et al. |
| 6,151,624 A | 11/2000 | Teare et al. |
| 6,167,369 A | 12/2000 | Schulze |
| 6,182,085 B1 | 1/2001 | Eichstaedt et al. |
| 6,182,113 B1 | 1/2001 | Narayanaswami |
| 6,185,558 B1 | 2/2001 | Bowman et al. |
| 6,202,058 B1 | 3/2001 | Rose et al. |
| 6,208,988 B1 | 3/2001 | Schultz |
| 6,216,123 B1 | 4/2001 | Robertson et al. |
| 6,222,559 B1 | 4/2001 | Asano et al. |
| 6,240,407 B1 | 5/2001 | Chang et al. |
| 6,240,408 B1 | 5/2001 | Kaufman |
| 6,247,013 B1 | 6/2001 | Morimoto |
| 6,263,364 B1 | 7/2001 | Najork et al. |
| 6,285,367 B1 | 9/2001 | Abrams et al. |
| 6,285,999 B1 * | 9/2001 | Page ................................ 1/1 |
| 6,304,864 B1 | 10/2001 | Liddy et al. |
| 6,317,741 B1 | 11/2001 | Burrows |
| 6,327,590 B1 | 12/2001 | Chidlovskii |
| 6,349,308 B1 | 2/2002 | Whang et al. |
| 6,351,467 B1 | 2/2002 | Dillon |
| 6,351,755 B1 | 2/2002 | Najork et al. |
| 6,360,215 B1 | 3/2002 | Judd et al. |
| 6,385,602 B1 | 5/2002 | Tso et al. |
| 6,389,436 B1 | 5/2002 | Chakrabarti et al. |
| 6,418,433 B1 | 7/2002 | Chakrabarti et al. |
| 6,418,452 B1 | 7/2002 | Kraft et al. |
| 6,418,453 B1 | 7/2002 | Kraft et al. |
| 6,442,606 B1 | 8/2002 | Subbaroyan et al. |
| 6,473,752 B1 | 10/2002 | Fleming |
| 6,484,204 B1 | 11/2002 | Rabinovich |
| 6,516,312 B1 | 2/2003 | Kraft et al. |
| 6,539,376 B1 | 3/2003 | Sundaresan et al. |
| 6,546,388 B1 | 4/2003 | Edlund et al. |
| 6,547,829 B1 | 4/2003 | Meyerzon et al. |
| 6,549,896 B1 | 4/2003 | Candan et al. |
| 6,549,897 B1 | 4/2003 | Katariya et al. |
| 6,553,364 B1 | 4/2003 | Wu |
| 6,594,682 B2 | 7/2003 | Peterson et al. |
| 6,598,047 B1 | 7/2003 | Russell et al. |
| 6,598,051 B1 | 7/2003 | Wiener et al. |
| 6,601,075 B1 | 7/2003 | Huang et al. |
| 6,622,140 B1 | 9/2003 | Kantrowitz |
| 6,628,304 B2 | 9/2003 | Mitchell et al. |
| 6,633,867 B1 | 10/2003 | Kraft et al. |
| 6,633,868 B1 | 10/2003 | Min et al. |
| 6,636,853 B1 * | 10/2003 | Stephens, Jr. ................. 1/1 |
| 6,638,314 B1 | 10/2003 | Meyerzon et al. |
| 6,671,683 B2 | 12/2003 | Kanno |
| 6,678,692 B1 * | 1/2004 | Hyatt ......................... 707/758 |
| 6,701,318 B2 | 3/2004 | Fox et al. |
| 6,718,324 B2 | 4/2004 | Edlund et al. |
| 6,718,365 B1 | 4/2004 | Dutta |
| 6,738,764 B2 | 5/2004 | Mao et al. |
| 6,763,362 B2 | 7/2004 | McKeeth |
| 6,766,316 B2 | 7/2004 | Caudill et al. |
| 6,766,422 B2 | 7/2004 | Beyda |
| 6,775,659 B2 | 8/2004 | Clifton-Bligh |
| 6,775,664 B2 | 8/2004 | Lang et al. |
| 6,778,997 B2 | 8/2004 | Sundaresan et al. |
| 6,829,606 B2 | 12/2004 | Ripley |
| 6,859,800 B1 | 2/2005 | Roche et al. |
| 6,862,710 B1 | 3/2005 | Marchisio |
| 6,868,411 B2 | 3/2005 | Shanahan |
| 6,871,202 B2 | 3/2005 | Broder |
| 6,883,135 B1 | 4/2005 | Obata et al. |
| 6,886,010 B2 | 4/2005 | Kostoff |
| 6,886,129 B1 | 4/2005 | Raghavan et al. |
| 6,910,029 B1 | 6/2005 | Sundaresan |
| 6,931,397 B1 | 8/2005 | Sundaresan |
| 6,934,714 B2 | 8/2005 | Meinig |
| 6,944,609 B2 | 9/2005 | Witbrock |
| 6,947,930 B2 | 9/2005 | Anick et al. |
| 6,959,326 B1 | 10/2005 | Day et al. |
| 6,973,490 B1 | 12/2005 | Robertson et al. |
| 6,990,628 B1 | 1/2006 | Palmer et al. |
| 7,016,540 B1 | 3/2006 | Gong et al. |
| 7,028,029 B2 | 4/2006 | Kamvar et al. |
| 7,039,234 B2 | 5/2006 | Geidl et al. |
| 7,051,023 B2 | 5/2006 | Kapur et al. |
| 7,072,888 B1 | 7/2006 | Perkins |
| 7,076,483 B2 | 7/2006 | Preda et al. |
| 7,080,073 B1 | 7/2006 | Jiang et al. |
| 7,107,218 B1 | 9/2006 | Preston |
| 7,152,059 B2 | 12/2006 | Monteverde |
| 7,181,438 B1 | 2/2007 | Szabo |
| 7,197,497 B2 | 3/2007 | Cossock |
| 7,228,301 B2 | 6/2007 | Meyerzon et al. |
| 7,231,399 B1 | 6/2007 | Bem et al. |
| 7,243,102 B1 | 7/2007 | Naam et al. |
| 7,246,128 B2 | 7/2007 | Jordahl |
| 7,257,574 B2 | 8/2007 | Parikh |
| 7,257,577 B2 | 8/2007 | Fagin et al. |
| 7,260,573 B1 | 8/2007 | Jeh et al. |
| 7,281,002 B2 | 10/2007 | Farrell |
| 7,308,643 B1 | 12/2007 | Zhu et al. |
| 7,328,401 B2 | 2/2008 | Obata et al. |
| 7,346,604 B1 | 3/2008 | Bharat et al. |
| 7,356,530 B2 | 4/2008 | Kim et al. |
| 7,386,527 B2 | 6/2008 | Harris et al. |
| 7,428,530 B2 | 9/2008 | Ramarathnam et al. |
| 7,496,561 B2 | 2/2009 | Caudill et al. |
| 7,519,529 B1 | 4/2009 | Horvitz |
| 7,580,568 B1 | 8/2009 | Wang et al. |
| 7,599,917 B2 | 10/2009 | Meyerzon et al. |
| 7,685,084 B2 | 3/2010 | Sisk et al. |
| 7,689,531 B1 | 3/2010 | Diao et al. |
| 7,716,225 B1 | 5/2010 | Dean et al. |
| 7,720,830 B2 | 5/2010 | Dean et al. |
| 7,761,448 B2 | 7/2010 | Meyerzon et al. |
| 7,840,569 B2 | 11/2010 | Meyerzon et al. |
| 2001/0042076 A1 | 11/2001 | Fukuda |
| 2002/0016787 A1 | 2/2002 | Elkan |
| 2002/0055940 A1 | 5/2002 | Elkan |
| 2002/0062323 A1 | 5/2002 | Takatori et al. |
| 2002/0078045 A1 | 6/2002 | Dutta |
| 2002/0099694 A1 | 7/2002 | Diamond et al. |
| 2002/0102798 A1 | 8/2002 | Mani et al. |
| 2002/0103798 A1 | 8/2002 | Abrol et al. |
| 2002/0107861 A1 | 8/2002 | Clendinning et al. |
| 2002/0107886 A1 | 8/2002 | Gentner et al. |
| 2002/0129014 A1 | 9/2002 | Kim et al. |
| 2002/0165873 A1 | 11/2002 | Kwok |
| 2002/0169595 A1 | 11/2002 | Agichtein et al. |
| 2002/0169770 A1 | 11/2002 | Kim et al. |
| 2003/0037074 A1 | 2/2003 | Dwork et al. |
| 2003/0053084 A1 | 3/2003 | Geidl et al. |
| 2003/0055810 A1 | 3/2003 | Cragun et al. |
| 2003/0061201 A1 | 3/2003 | Grefenstette et al. |
| 2003/0065706 A1 | 4/2003 | Smyth et al. |
| 2003/0074368 A1 | 4/2003 | Schuetze et al. |
| 2003/0088545 A1 | 5/2003 | Subramaniam et al. |
| 2003/0135490 A1 | 7/2003 | Barrett et al. |
| 2003/0208482 A1 | 11/2003 | Kim et al. |
| 2003/0217007 A1 | 11/2003 | Fukushima et al. |
| 2003/0217047 A1 | 11/2003 | Marchisio |
| 2003/0217052 A1 | 11/2003 | Rubenczyk et al. |
| 2004/0003028 A1 | 1/2004 | Emmett et al. |
| 2004/0006559 A1 | 1/2004 | Gange et al. |
| 2004/0049766 A1 | 3/2004 | Bloch et al. |
| 2004/0093328 A1 | 5/2004 | Damle |
| 2004/0111408 A1 | 6/2004 | Caudill et al. |
| 2004/0117351 A1 | 6/2004 | Challapalli et al. |
| 2004/0148278 A1 | 7/2004 | Milo et al. |
| 2004/0181515 A1 | 9/2004 | Ullmann et al. |
| 2004/0186827 A1 | 9/2004 | Anick et al. |
| 2004/0194099 A1 | 9/2004 | Lamping et al. |
| 2004/0199497 A1 | 10/2004 | Timmons |
| 2004/0205497 A1 | 10/2004 | Alexander et al. |
| 2004/0215664 A1 | 10/2004 | Hennings et al. |
| 2004/0254932 A1 | 12/2004 | Gupta et al. |
| 2005/0033742 A1 | 2/2005 | Kamvar et al. |
| 2005/0044071 A1 | 2/2005 | Cho et al. |

| | | |
|---|---|---|
| 2005/0055340 A1 | 3/2005 | Dresden |
| 2005/0055347 A9 | 3/2005 | Cho et al. |
| 2005/0060186 A1 | 3/2005 | Blowers et al. |
| 2005/0060304 A1 | 3/2005 | Parikh |
| 2005/0060310 A1 | 3/2005 | Tong et al. |
| 2005/0060311 A1 | 3/2005 | Tong et al. |
| 2005/0071328 A1 | 3/2005 | Lawrence |
| 2005/0071741 A1 | 3/2005 | Acharya et al. |
| 2005/0086192 A1 | 4/2005 | Kodama |
| 2005/0086206 A1 | 4/2005 | Balasubramanian |
| 2005/0086583 A1 | 4/2005 | Obata et al. |
| 2005/0089215 A1 | 4/2005 | Staelin et al. |
| 2005/0144162 A1 | 6/2005 | Liang |
| 2005/0154746 A1 | 7/2005 | Liu et al. |
| 2005/0165781 A1 | 7/2005 | Kraft et al. |
| 2005/0187965 A1 | 8/2005 | Abajian |
| 2005/0192936 A1 | 9/2005 | Meek et al. |
| 2005/0192955 A1 | 9/2005 | Farrell |
| 2005/0210006 A1 | 9/2005 | Robertson |
| 2005/0216533 A1 | 9/2005 | Berkhin |
| 2005/0240580 A1 | 10/2005 | Zamir et al. |
| 2005/0251499 A1 | 11/2005 | Huang |
| 2005/0262050 A1* | 11/2005 | Fagin et al. ................... 707/3 |
| 2005/0283473 A1 | 12/2005 | Rousso et al. |
| 2006/0036598 A1 | 2/2006 | Wu |
| 2006/0047649 A1 | 3/2006 | Liang |
| 2006/0069982 A1 | 3/2006 | Petriuc |
| 2006/0161534 A1 | 7/2006 | Carson et al. |
| 2006/0173560 A1 | 8/2006 | Widrow |
| 2006/0195440 A1 | 8/2006 | Burges et al. |
| 2006/0200460 A1 | 9/2006 | Meyerzon et al. |
| 2006/0206460 A1 | 9/2006 | Gadkari et al. |
| 2006/0206476 A1 | 9/2006 | Kapur et al. |
| 2006/0212423 A1 | 9/2006 | Jones et al. |
| 2006/0282306 A1 | 12/2006 | Thissen-Roe |
| 2006/0282455 A1 | 12/2006 | Lee et al. |
| 2006/0287993 A1 | 12/2006 | Yao et al. |
| 2007/0038616 A1 | 2/2007 | Guha |
| 2007/0073748 A1 | 3/2007 | Barney |
| 2007/0106659 A1 | 5/2007 | Lu et al. |
| 2007/0150473 A1 | 6/2007 | Li et al. |
| 2007/0198459 A1 | 8/2007 | Boone et al. |
| 2007/0260597 A1 | 11/2007 | Cramer et al. |
| 2007/0276829 A1 | 11/2007 | Wang et al. |
| 2008/0140641 A1 | 6/2008 | Wang |
| 2008/0195596 A1 | 8/2008 | Sisk et al. |
| 2009/0106221 A1 | 4/2009 | Meyerzon et al. |
| 2009/0106223 A1 | 4/2009 | Meyerzon et al. |
| 2009/0106235 A1 | 4/2009 | Tankovich et al. |
| 2009/0240680 A1 | 9/2009 | Tankovich |

FOREIGN PATENT DOCUMENTS

| | | |
|---|---|---|
| EP | 0950961 | 10/1999 |
| EP | 1050830 A2 | 11/2000 |
| EP | 1120717 A2 | 8/2001 |
| EP | 1282060 | 2/2002 |
| EP | 1557770 | 7/2005 |
| JP | 10091638 | 4/1998 |
| JP | 11328191 | 11/1999 |
| JP | 2001-265774 | 9/2001 |
| JP | 2002-091843 | 3/2002 |
| JP | 2002-132769 | 10/2002 |
| JP | 2003-67419 | 3/2003 |
| JP | 2003-248696 | 9/2003 |
| JP | 2004-054588 | 2/2004 |
| KR | 10-2002-0015838 A | 3/2002 |
| KR | 10-2003-0082109 A | 10/2003 |
| KR | 10-2006-0116042 A | 11/2006 |
| KR | 10-2008-0017685 | 2/2008 |
| RU | 2138076 | 9/1999 |

OTHER PUBLICATIONS

Jones et al, "A probabilistic model of information retrieval: development and status", University of Cambridge, UK, 1998.*

"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.

"Microsoft Full-Text Search Technologies", http://www.microsoft.com/technet/prodtechnol/sppt/sharepoint/evaluate/featfunc/ms-searc..., published on Jun. 1, 2001, printed on May 22, 2006, 13 pp.

"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.

"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.

"SharePoint Portal Server 2001 Planning and Installation Guide", http://www.microsoft.com/technet/prodtechnol/sppt/sharepoint/plan/planinst.mspx, printed on May 22, 2006, 86 pp.

Agichten et al. "Improving Web Search Ranking by Incorporating User Behavior Information"—http://www.mathcs.emory.edu/-eugene/papers/sigir2006ranking.pdf, 8 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

Brin, S. et al., "The Anatomy of a Large-Scale Hypertextual Web Search Engine", In Proceedings of the 7th International World Wide Web Conference, Brisbane, Australia, pp. 107-117, 1998.

Burges, Christopher J.C. et al. "Learning to Rank with Nonsmooth Cost Functions"—http://books.nips.cc/papers/txt/nips_19/NIPS2006_0574.txt, 2 pp.

Cannel, D. et al., "Searching XML Documents Via XML Fragments", SIGIR Toronto, Canada, Jul.-Aug. 2003, pp. 151-158.

Chakrabarti, S., "Recent Results in Automatic Web Resource Discovery", ACM Computing Surveys, vol. 31, No. 4es, Dec. 1999, pp. 1-7.

Chen, Hsinchun et al., "A Smart Itsy Bitsy Spider for the Web", Journal of American Society for Information Science, 49(7), 1998, pp. 604-618.

Chen, Michael et al., Cha Cha, "A System for Organizing Internet Search Results", Computer Science Department, University of California, Berkeley, 1999, pp. 1-12.

Cho et al., "Efficient Crawling Through URL Ordering", In Proceedings of the 7th International World Wide Web Conference, Apr. 1998, pp. 161-180.

Craswell, N. et al., "TREC12 Web Track as CSIRO", TREC 12, Nov. 2003, 11 pp.

Cutler, M. et al., "A New Study on Using HTML Structures to Improve Retrieval", 11th IEEE International Conference on Chicago, IL, Nov. 9-11, 1999, pp. 406-409.

Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.

Fagin, R. et al., "Searching the Workplace Web", May 20, 2003, Retrieved from the Internet: www.almaden.ibm.com/cs/people/fagin/www03.pdf [retrieved on Jul. 27, 2006].

Fagin, R. et al., "Searching the Workplace Web", IBM Almaden Research Center, In Proceedings of the Twelfth International World Wide Web Conference, Budapest, 2003, 21 pgs.

Fagin, Ronald, Searching the Workplace Web, Mar. 3, 2005, pp. 1-10.

Hawking, D. et al., "Overview of the TREC-8 Web Track", TREC, Feb. 2000, pp. 1-18.

Hawking, D., "Overview of the TREC-9 Track", TREC, 2000, pp. 1-16.

Hawking., D. et al., "Overview of TREC-7 Very Large Collection Track", TREC, Jan. 1999, pp. 1-13.

Heery, Rachel, "Review of Metadata Formats", Program, vol. 30, No. 4, Oct. 1996, 1996 IEEE, pp. 345-373.

Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.

Huang et al., "Design and Implementation of a Chinese Full-Text Retrieval System Based on Probabilistic Model", IEEE, 1993, pp. 1090-1093.

Jones, K. et al., "A probabilistic model of information retrieval: development and status", Department of Information Science, City University, London, Aug. 1998, 74 pgs.

Kleinberg, Jon M., "Authoritative Sources in a Hyperlinked Environment", Proceedings of the aCM-SIAM symposium on Discreet Algorithms, 1998, 34 pp.

Kotsakis, E., "Structured Information Retrieval in XML Documents", Proceedings of the ACM Symposium on Applied Computing, Madrid, Spain, 2002, pp. 663-667.

Kucuk, Mehmet Emin, et al., "Application of Metadata Concepts to Discovery of Internet Resources", ADVIS 2000, INCS 1909, pp. 304-313, 2000.

Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.

Lam et al., "Automatic Document Classification Based on Probabilistic Reasoning: Model and Performance Analysis", IEEE, 1997, pp. 2719-2723.

Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.

Lee, J.K.W. et al., "Intelligent Agents for Matching Information Providers and Consumers on the World-Wide Web", IEEE, 1997, pp. 189-199.

Ljosland, Mildrid, Evaluation of Web Search Engines and the Search for Better Ranking Algorithms, http://www.aitel.hist.no/-mildrid/dring/paper/SIGIR.html, SIGIR99 Workshop on Evaluation of Reb Retrieval, Aug 19, 1999, 5 pages.

Losee, R. et al., "Research in Information Organization", Literature Review, School of Information and Library Science, Section 4, pp. 53-96, Jan. 2001.

Losee, Robert M. et al., "Measuring Search Engine Quality and Query Difficulty: Ranking with Target and Freestyl,." http:/ils.unc.edu/-losee/paril.pdf, Journal of the American Society for Information Science, Jul. 29, 1999, 20 pages.

Managing External Content in Microsoft Office Share/Point Portal Server 2003, http://www.microsoft.com/technet/prodtechnol/sppt/reskit/c2261881tx.mspx, published on Jun. 9, 2004, printed on May 22, 2006m 20 pp.

Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.

Matveeva, Irina et al., "High Accuracy Retrieval with Multiple Nested Ranker," http://people.cs.uchicago.edu/-matveeva/Ranker/SIGIR06.pdf, SIGIR '06, Seattle, WA Aug. 6-11, 2006, 8 pages.

Microsoft Full-Test Search Technologies, http://www.microsoft.com/technet/prodtechnol/sppt/sharepoin/evaluate/featfunc/ms-searc..., published on Jun. 1, 2001, printed on May 22, 2006, 13 pp.

Microsoft SharePoint Portal Server 2001 Resource Kit Chapter 24, Analyzing the Default Query for the Dashboard, http://www.microsoft.com/technet/prodtechnol/sppt/sharepoint/reskit/part5/c24spprk.mspx, printed on May 22, 2006, 5 pp.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

MSDN, "Understanding Ranking," http://msdn.microsoft.com/en-us/library/ms242524.aspx, Sep. 2007, 4 pages.

Najork, Marc et al., "Breatdth-First Crawling Yields High-Quality Pages", ACM, Compaq Systems Research Center, Hong Kong, 2001, pp. 114-118.

Nelson, Chris, "Use of Metadata Registries for Searching for Statistical Data", IEEE 2002, Dimension EDI Ltd., pp. 232-235, 2002.

Numerico, T., "Search engines organization of information and Web Topology," http://www.cafm.lsbu.ac.uk/eminars/sse/numerico-6-dec-2004.pdf, Dec. 6, 2004, 32 pgs.

Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.

Planning Your Information Structure Using Microsoft Office SharePoint Portal Server 2003, http://www.microsoft.com/technet/prodtechnol/sppt/reskit/c0861881x.mspx,.published on Jun. 9, 2004, printed on May 22, 2006, 22 pp.

Radlinski, Filip, et al., "Query Chains: Learning to Rank from Implicit Feedback" http://delivery.acm.org/10.1145/1090000/1081899/p239-radlinski.pdf?key1=1081899&key2=3628533811&coll=GUIDE& CFID=27212902&CFTOKEN=53118399, KDD '05, Chicagol, IL, Aug. 21-24, 2005, 10 pages.

Robertson, S. et al., "Okapi at TREC-4", 1996, 24 pp.

Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.

Schulz, Stefan, et al., "Indexing Medical WWW Documents by Morphemes", MEDINFO 2001 Proceedings of The $10^{th}$ World Congress on Medical Informatics, Park I, IOS Press, Inc., pp. 266-270, 2001.

Senecal, Sylvain, Consumers' decision-making process and their online shopping behavior: a clickstream analysis, Jun. 1, 2004, pp. 1600-1607.

Shamsfard, Mehmoush, et al., "ORank: An Ontology based System for Ranking Documents," http//www.waset.org/ijcs/v1/v1-3-30.pdf, International Journal of Computer Science, vol. 1, No. 3, Apr. 10, 2006, pp. 225-231.

SharePoint Portal Server 2001 Planning and Installation Guide, http://www.microsoft.com/technet/prodtechnol/sppt/sharepoint/plan/pianinst.mspx, printed on May 22, 2006, 86 pp.

Singhal, a. et al., "AT&T at TREC-9", Proceedings of the Ninth Text Retrieval Conference, NIST Special Publication 500-249, 'Online! 2001, pp. 103-105.

Smyth, Barry, Relevance at a Distance—An Investigation of Distance-Biased Personalization in the Mobile Internet, Jan. 2003, pp. 1-6.

Sturdy, Derek, "Squirrels and nuts: metadata and knowledge management", Business Information Review, 18(4), pp. 34-42, Dec. 2001.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&d1=GUIDE&CFID=22810237&CFTOKEN=34449120, Nov. 5-11, 2006, pp. 585-593.

Voorhees, E., "Overview of TREC 2002", Gaithersburg, Maryland, Nov. 19-22, 15 pp.

Web Page "Reuters: Reuters Corpus", http://about.reuter.com/researchandstandards/corpus/, viewed Mar. 18, 2004.

Wen, Ji-Rong, Query Clustering using user Logs, Jan. 2002, pp. 59-81.

Westerveld, T. et al., "Retrieving Web pages using Content, Links, URLs and Anchors", Proceedings of the Tenth Text Retrieval Conference, NIST Special Publication, 'Online! Oct. 2001, pp. 1-10.

Wilkinson, R., "Effective Retrieval of Structured Documents", Annual ACM Conference on Research and Development, 1994, 7 pp.

Xue, Gui-Rong et al., "Optimizing Web Search Using Web Click-Through Data," http://people.cs.vt.edu/-xwensi/Publication/p118-xue.pdf, CIKM'04, Nov. 8-13, 2004, 9 pages.

Yi, Jeonghe,e et al., "Metadata Based Web Mining for Topic-Specific Information Gathering", IEEE, pp. 359-368, 2000.

Yi, Jeonghee, et al., "Using Metadata to Enhance Web Information Gathering", D.Suciu and G. Vossen (eds.): WebDB 2000, LNCS 1997, pp. 38-57, 2001.

Yuwono, Budi and Lee, Dik L., "Search and Ranking Algorithms for Locating Resources on the World Wide Web", IEEE, 1996, pp. 164-170.

Zamir, O. et al., "Grouper: A Dynamic Clustering Interface to Web Search Results", Computer Networks (Amsterdam, Netherlands: 1999), 31(11-16): 1361-1374, 1999.

U.S. Appl. No. 09/493,748, filed Jan. 28, 2000, entitled "Adaptive Web Crawling Using a Statistical Model."

U.S. Appl. No. 10/804,326, filed Mar. 18, 2004 entitled "Field Weighting in Text Document Searching."

U.S. Appl. No. 10/955,462, filed Sep. 30, 2004 entitled "System and Method for Incorporating Anchor Text Into Ranking Search Results."
U.S. Appl. No. 11/019,091, filed Dec. 21, 2004 entitled "Ranking Search Results Using Feature Extraction."
U.S. Appl. No. 11/073,381, filed Mar. 3, 2005 entitled "System and Method for Ranking Search Results Using File Types."
U.S. Appl. No. 11/238,906, filed Sep. 29, 2005 entitled "Click Distance Determination."
U.S. Appl. No. 11/412,723, filed Apr. 26, 2006, entitled "Ranking Search Results Using Language Types."
U.S. Official Action in U.S. Appl. No. 10/609,315 mailed Dec. 15, 2005.
U.S. Official Action in U.S. Appl. No. 10/609,315 mailed Jun. 1, 2006.
U.S. Official Action in U.S. Appl. No. 10/804,326 mailed Oct. 16, 2006.
U.S. Official Action in U.S. Appl. No. 10/804,326 mailed Jun. 7, 2007.
U.S. Official Action in U.S. Appl. No. 10/804,326 mailed Dec. 11, 2007.
U.S. Official Action in U.S. Appl. No. 10/804,326 mailed Dec. 10, 2008.
U.S. Official Action in U.S. Appl. No. 11/073,381 mailed Sep. 18, 2007.
U.S. Official Action in U.S. Appl. No. 11/073,381 mailed Jul. 10, 2008.
U.S. Official Action in U.S. Appl. No. 11/073,381 mailed Apr. 15, 2009.
U.S. Official Action in U.S. Appl. No. 11/073,381 mailed Sep. 29, 2009.
U.S. Official Action in U.S. Appl. No. 11/073,381 mailed Apr. 12, 2010.
U.S. Official Action in U.S. Appl. No. 11/073,381 mailed Sep. 13, 2010.
U.S. Official Action in U.S. Appl. No. 10/981,962 mailed Apr. 5, 2006.
U.S. Official Action in U.S. Appl. No. 10/981,962 mailed Sep. 21, 2006.
U.S. Official Action in U.S. Appl. No. 10/981,962 mailed Apr. 30, 2007.
U.S. Official Action in U.S. Appl. No. 10/981,962 mailed Mar. 17, 2008.
U.S. Official Action in U.S. Appl. No. 10/955,462 mailed Nov. 3, 2006.
U.S. Official Action in U.S. Appl. No. 10/955,462 mailed May 11, 2007.
U.S. Official Action in U.S. Appl. No. 10/955,462 mailed Sep. 10, 2007.
U.S. Official Action in U.S. Appl. No. 11/874,579 mailed Jan. 14, 2011.
U.S. Official Action in U.S. Appl. No. 10/955,983 mailed Mar. 22, 2007.
U.S. Official Action in U.S. Appl. No. 10/955,983 mailed Nov. 13, 2007.
U.S. Official Action in U.S. Appl. No. 10/955,983 mailed Jul. 21, 2008.
U.S. Official Action in U.S. Appl. No. 10/955,983 mailed Dec. 18, 2008.
U.S. Official Action in U.S. Appl. No. 10/955,983 mailed Jun. 10, 2009.
U.S. Official Action in U.S. Appl. No. 11/412,723 mailed May 28, 2008.
U.S. Official Action in U.S. Appl. No. 11/412,723 mailed Mar. 6, 2009.
U.S. Official Action in U.S. Appl. No. 11/412,723 mailed Sep. 3, 2009.
U.S. Official Action in U.S. Appl. No. 11/412,723 mailed Mar. 11, 2010.
U.S. Official Action in U.S. Appl. No. 11/019,091 mailed Jun. 20, 2007.
U.S. Official Action in U.S. Appl. No. 11/019,091 mailed Apr. 3, 2008.
U.S. Official Action in U.S. Appl. No. 11/019,091 mailed Dec. 11, 2008.
U.S. Official Action in U.S. Appl. No. 11/019,091 mailed Sep. 1, 2009.
U.S. Official Action in U.S. Appl. No. 11/206,286 mailed Jul. 14, 2008.
U.S. Official Action in U.S. Appl. No. 11/206,286 mailed Dec. 24, 2008.
U.S. Official Action in U.S. Appl. No. 11/238,906 mailed Jan. 8, 2008.
U.S. Official Action in U.S. Appl. No. 11/238,906 mailed Sep. 16, 2008.
U.S. Official Action in U.S. Appl. No. 11/238,906 mailed May 19, 2009.
U.S. Official Action in U.S. Appl. No. 11/238,906 mailed Dec. 18, 2009.
U.S. Official Action in U.S. Appl. No. 11/874,844 mailed Nov. 13, 2009.
EP Search Report in EP 00309121 mailed Jul. 18, 2002.
EP Search Report in EP 05105110 dated Aug. 11, 2006.
EP Exam Report in EP 00309121.2-1522 mailed Jul. 4, 2003.
EP Exam Report in EP 00309121.2-1527 mailed Jun. 16, 2004.
EP Search Report in EP 05105048 mailed Jan. 17, 2006.
EP Exam Report in EP 00309121.2-1527 mailed Feb. 8, 2007.
EP Exam Report in EP 05105048.2-2201 mailed Apr. 23, 2007.
PCT Search Report in PCT/US2008/011894 mailed Feb. 27, 2009.
PCT Search Report in PCT/US2006/031965 mailed Jan. 11, 2007.
Chinese First Official Action in 200510088213.5 mailed May 9, 2008.
Chinese Second Official Action in 200510088213.5 mailed Oct. 10, 2008.
Chinese Decision on Rejection in 200510088213.5 mailed Mar. 6, 2009.
Chinese First Official Action in 200510088527.5 mailed Apr. 18, 2008.
Chinese First Official Action in 200680029645.1 mailed Jun. 19, 2009.
Chinese First Official Action in 200680035828.4 mailed Jun. 19, 2009.
Chinese Second Office Action in Chinese Application No. 200680029645.1 mailed Apr. 6, 2010.
Japanese Notice of Rejection in 2008-527094 mailed Sep. 11, 2009.
Japanese Final Rejection in 2008-527094 mailed Jan. 22, 2010.
Egyptian Official Action in PCT 269/2008 mailed Feb. 1, 2010.
Russian Official Action in 2008105758 mailed Jun. 29, 2010.
European Official Action in 05105110.0-1527 mailed Aug. 4, 2010.
Chinese Decision on Rejection in 200680029645.1 mailed Aug. 12, 2010.
Agarwal et al.; "Ranking Database Queries Using User Feedback: A Neural Network Approach", Fall 2006, 9 pp.
Conlon, M. "Inserts Made Simple", American Printer, Nov. 1, 2002, 4 pages.
Kazama, K., "A Searching and Ranking Scheme Using Hyperlinks and Anchor Texts", IPSJ SIG Technical Report, vol. 2000, No. 71, Information Processing Society of Japan, Jul. 28, 2000, pp. 17-24.
Kowk, K.L., "A Network Approach to Probabilistic Information Retrieval", ACM Transaction on Information Systems vol. 13, No. 3, Jul. 1995, pp. 324-353.
Matsuo, Y., "A New Definition of Subjective Distance Between Web Pages" IPSJ Journal, vol. 44, No. 1, Information Processing Society of Japan, Jan. 15, 2003, pp. 88-94.
Nie, Jien Yun, "Introduction to Information Retrieval", University of Montreal Canada, 1989, pp. 1-11.
"Okapi Similarity Measurement (Okapi)", $11^{th}$International Web Conference, 2002, p. 1.
Singhal, A. et al., "Document Length Normalization", Cornell University, vol. 32, No. 5, 1996, pp. 619-633.
U.S. Official Action in U.S. Appl. No. 11/073,381 mailed Feb. 23, 2011.
U.S. Official Action in U.S. Appl. No. 11/874,579 mailed Jun. 22, 2010.
U.S. Official Action in U.S. Appl. No. 12/207,910, mailed Jun. 7, 2011.

Chinese Second Official Action in 200510088527.5 mailed Dec. 26, 2008.
Chinese Third Official Action in 200510088213.5 mailed Sep. 4, 2009.
PCT Search Report in PCT/US2009/063333 dated Apr. 22, 2010.
Japanese Notice of Rejection in 2005-175172 mailed Sep. 28, 2010.
Japanese Notice of Rejection in 2005-175173 mailed Oct. 1, 2010.

Australian First Examiner's Report in 2006279520 mailed Oct. 5, 2010.
European Search Report in 08840594.9-2201 mailed Jan. 21, 2011.
European Search Report in 08840594.9-2201 mailed Feb. 23, 2011.
Philippines Official Action in 1-2008-500189 mailed Jun. 22, 2011.
Japanese Final Rejection in 2005-175172 mailed Jun. 7, 2011.

* cited by examiner

SYSTEM AND METHOD FOR RANKING SEARCH RESULTS USING CLICK DISTANCE

CROSS-REFERENCE TO RELATED APPLICATIONS

This application claims priority to U.S. application Ser. No. 10/955,983 filed on Sep. 30, 2004, entitled "System And Method For Ranking Search Results Using Click Distance," now U.S. Pat. No. 7,761,448, the disclosure of which is hereby incorporated by reference in its entirety.

The present invention is related to U.S. Pat. No. 7,739,277, entitled "System and Method for Incorporating Anchor Text into Ranking Search Results," issued Sep. 30, 2004, and to U.S. Pat. No. 7,584,221, entitled "Field Weighting in Text Document Searching," issued on Sep. 1, 2009, which are assigned to the assignee of the present patent application and the disclosures of which are hereby incorporated by reference in their entireties.

BACKGROUND OF THE INVENTION

In a text document search, a user typically enters a query into a search engine. The search engine evaluates the query against a database of indexed documents and returns a ranked list of documents that best satisfy the query. A score, representing a measure of how well the document satisfies the query, is algorithmically generated by the search engine. Commonly-used scoring algorithms rely on splitting the query up into search terms and using statistical information about the occurrence of individual terms in the body of text documents to be searched. The documents are listed in rank order according to their corresponding scores so the user can see the best matching search results at the top of the search results list.

Another evaluation that certain search engines may employ to improve the quality of the results is to modify the rank of the results by a selected ranking function. One exemplary prior art ranking function determines that when one page links to another page, it is effectively casting a vote for the other page. The more votes that are cast for a page, the more important the page. The ranking function can also take into account who cast the vote. The more important the page, the more important their vote. These votes are accumulated and used as a component of the ratings of the pages on the network.

A ranking function is used to improve the quality of the ranking However, the effectiveness of the ranking function may be affected by the topology of the network. For example, the ranking function using the votes described above may be less effectual in an intranet setting. An intranet is a network that uses some of the same protocols as the Internet, but is accessible only by a subset of users, such as employees of a corporation. The pages of an intranet are not structured or connected exactly like the Internet, and so the relevancy of the results produced by a ranking function may not be reduced as compared to the Internet setting.

SUMMARY OF THE INVENTION

Embodiments of the present invention are related to a system and method for ranking search results according to a new function referred to as click distance. The click distance function takes advantage of the hierarchical structure of an intranet. An intranet usually follows a tree structure, with a root node and subsequent branches extending to other nodes from that root. Often the root node of the intranet is referred to as its homepage. Other sites outside of the intranet setting may also be based on a hierarchical structure, and click distance for these sites would also be highly applicable for ranking the site's pages.

Click distance is a query-independent relevance measure that measures the number of "clicks" required to reach a given page of the site. In the tree structure, the number of clicks is represented by the number of branches traversed on the path from the root node. Once the click distance is determined for a page, the click distance is incorporated into the score for the page. The page's score incorporating the click distance determines the page's rank among the other pages within the search results.

In one aspect of the present invention, the network is first "crawled" to generate a table of properties associated with the links and pages of the network. "Crawling" refers to automatically collecting several documents (or any analogous discrete unit of information) into a database referred to as an index. Crawling traverses multiple documents on the network by following document reference links within certain documents, and then processing each document as found. The documents are processed by identifying key words or general text in the documents to create the index.

An exemplary index can be an inverted list that has a column of words and a column indicating in which documents those words can be found. When a user enters in one or more search terms, the results are obtained and the present invention applies a ranking algorithm that includes the click distance function. The click distance function positively or negatively affects the score of certain pages, refining the results returned to the user.

In another aspect of the invention, a URL (Uniform Resource Locator) depth property is added to the ranking algorithm to further refine the results. The URL depth property measures the number of levels in the URL to provide a check against the click distance function and adjust the page's score accordingly.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
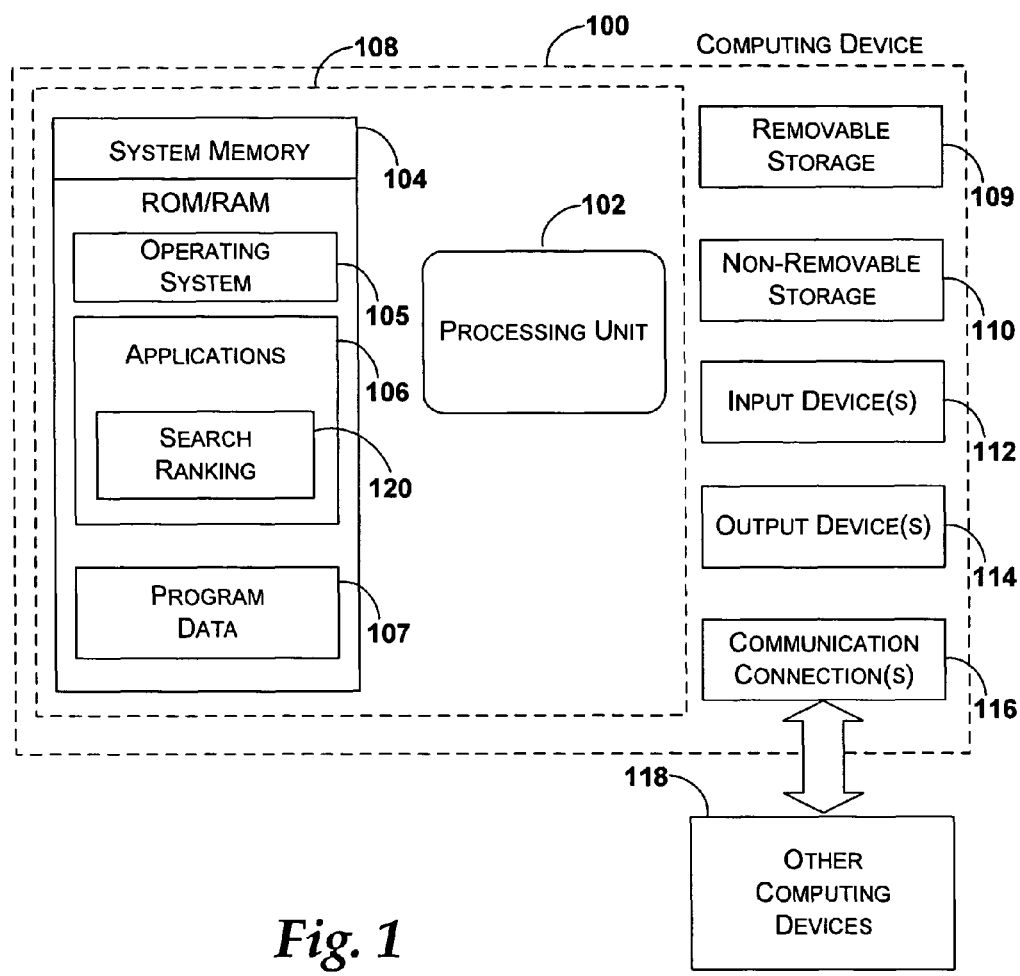
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a search ranking application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Ranking Searches by Click Distance

Embodiments of the present invention are related to a ranking function for a search engine. The quality of a search engine is typically determined by the relevance of the documents according to the ranks assigned by the ranking function. The ranking function can be based on multiple features. Some of these features may depend on the query, while others are considered query independent. This invention utilizes a query-independent measure of relevance referred to as click distance Click distance is the number of "clicks" a user will have to do from the homepage of the intranet (the most authoritative URL on the intranet, or one of the most authoritative URLs) to the given page. On a web graph, the click distance can be represented as the shortest path between the homepage and the given page. In one embodiment, an algorithm performs breadth first traversal and computes distance between a given node to all other nodes in the graph. The traversal can take N iterations to complete, where N is the diameter of the graph (maximum shortest distance), to compute click distance for the intranet. The variable N in this case is much smaller than the total number of nodes on the graph. For example, N for the present invention may be between 5 and 60 depending on the network. Other ranking functions can require 40-50 iterations to cover the graph (e.g., page rank), causing the other ranking functions to be several times slower than using click distance.

Figure 2:
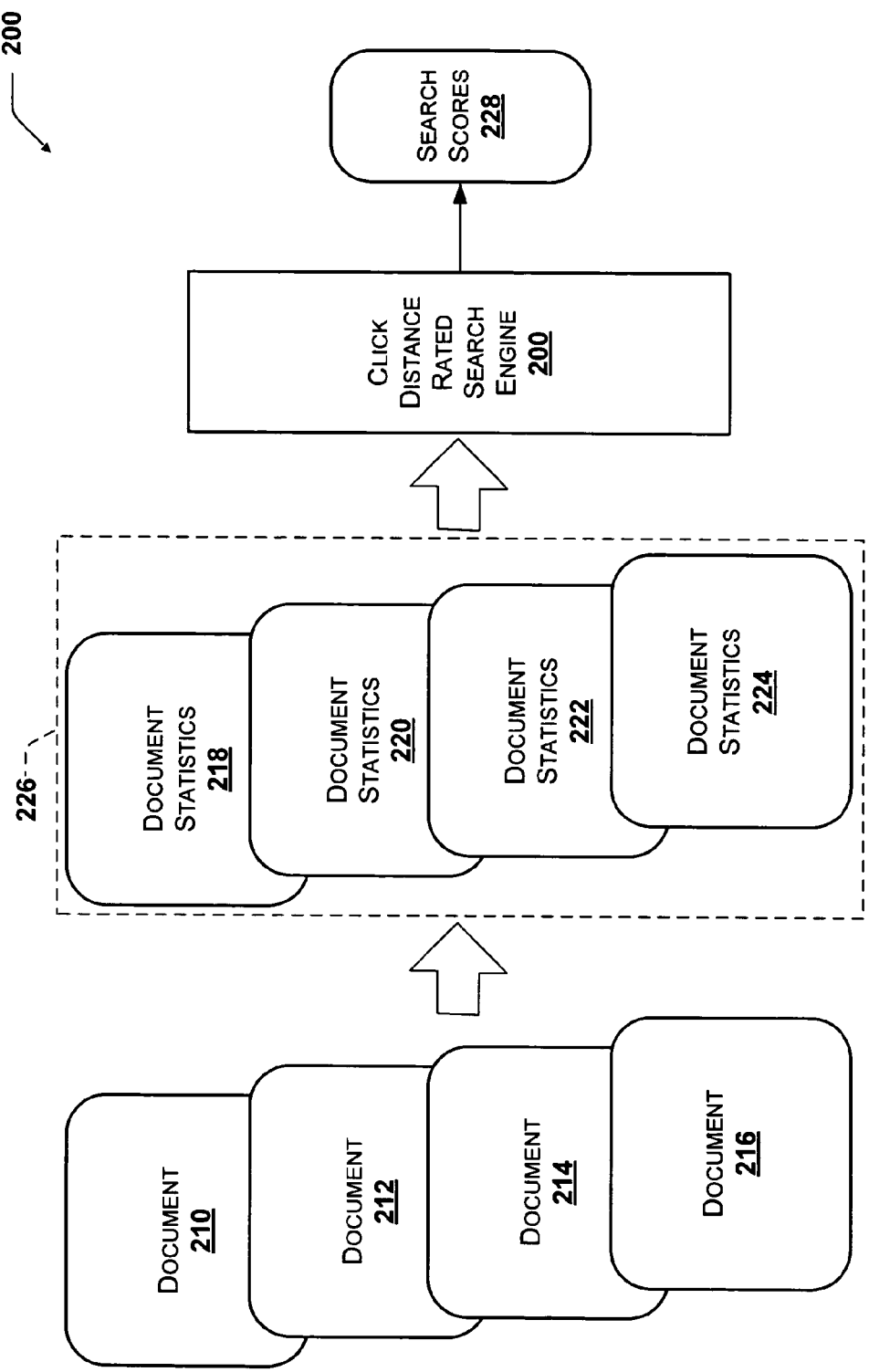
FIG. 2 illustrates a system for ranking search results according to click distance in accordance with the present invention.

FIG. 2 illustrates a system for ranking search results according to click distance in accordance with the present invention. The search engine 200 receives a query containing multiple query terms. Each query term may include multiple component terms, such as when the query term is a phrase (e.g., the phrase "document management system" may be considered a single query term"). In addition, a query may include one or more operators, such as Boolean operators, constraints, etc., which are commonly supported by known search engines.

A plurality of documents on a distributed network, represented by documents 210, 212, 214, and 216, are available for searching. In practice, a search engine may search any number of documents and typically search collections containing large numbers (e.g., millions) of documents. The volume of documents may be reduced from the Internet setting to the intranet setting, but the reduction is usually from billions to millions so that the relative number documents is still quite large. An indexing module (not shown) generates individual document statistics (e.g., 218, 220, 222, and 224) for each document. The document statistics are stored in an index 226.

Search engine 200 consults index 226 to determine a search score 228 for each document based on the query and the corresponding document statistics. In the present invention, one of the documents statistics included is the click distance of the document. In another embodiment, another document statistic included is the URL depth associated with the document. Click distance and URL depths are then combined with query dependent statistics to form a document's final score. Typically, document scores 228 are then ranked in descending order to give the user a list of documents that are considered by the search algorithm to be most relevant to the query.

In the illustrated system, the search engine 200 represents a click distance ranking search engine, which considers the click distance of a document in determining the document's search score. Click distance rating of a document leverages the presence of the document in a hierarchically structured site (see FIG. 3), measuring the distance from the site's homepage to the document. In one instance, the click distance from the homepage is a measure of the importance of the page, where pages closer in the hierarchy to the homepage are considered more important than the pages lower in the hierarchy. However, other scenarios may exist where the opposite holds true, where documents lower in the hierarchy are considered more than those pages higher in the hierarchy. Click distance is therefore considered a query-independent relevance measure since it rates the document's importance overall rather than according to the query (e.g., a query-dependent ranking function would be counting the number of times a search term appears in a document).

Figure 3:
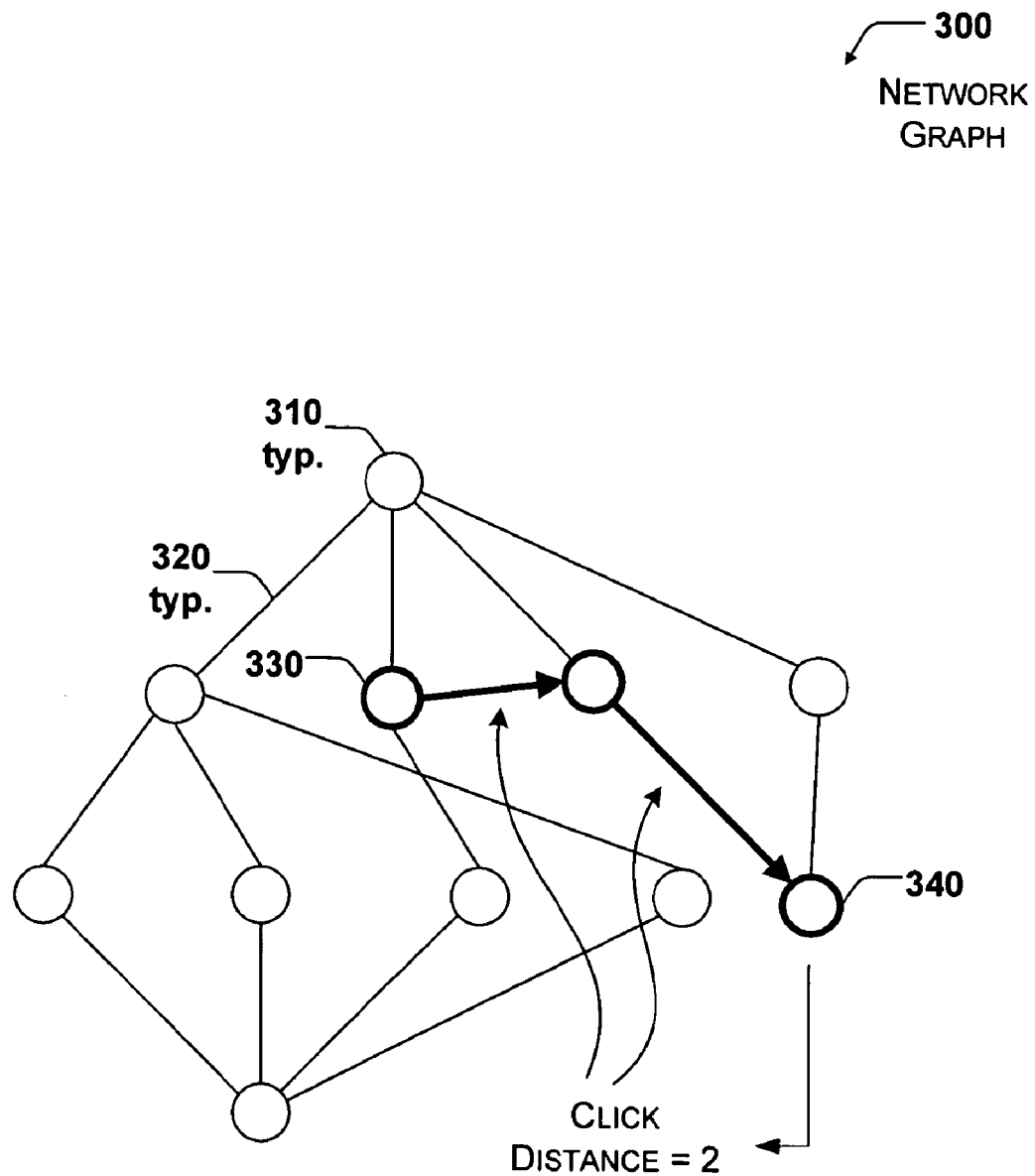
FIG. 3 illustrates an exemplary network graph in accordance with the present invention.

FIG. 3 illustrates an exemplary network graph in accordance with the present invention. The network graph is comprised of nodes (e.g., 310) and edges or links (e.g., 320). The nodes (e.g., 310) represent the pages and other resources that are on the network that may be returned as results to a search query. The links (e.g., 320) connect each one of these pages together through the use of navigation links listed on the pages. A set of link information may be gathered for each page that can be used in calculating the click distance for a particular page.

In one embodiment, node 330 represents the highest authority page or root node on the network for a group of documents. The click distance for the remaining pages of the network may be calculated from node 330. For example, node 340 has a click distance of two "clicks" from node 330. As stated above, "clicks" refers to the number of branches traversed on the shortest path from the highest authority node. Other paths from node 330 could have been chosen to reach node 340, but click distance is concerned with the shortest path.

Network graph 300 is shown with nodes that do not conform to a particular order, and may be similar to the Internet in that aspect. With the lack of order, the applicability of click distance for ranking pages may be difficult to conceptualize. However, often the network of pages and resources does conform to an applied order as shown in FIG. 4 below.

Figure 4:
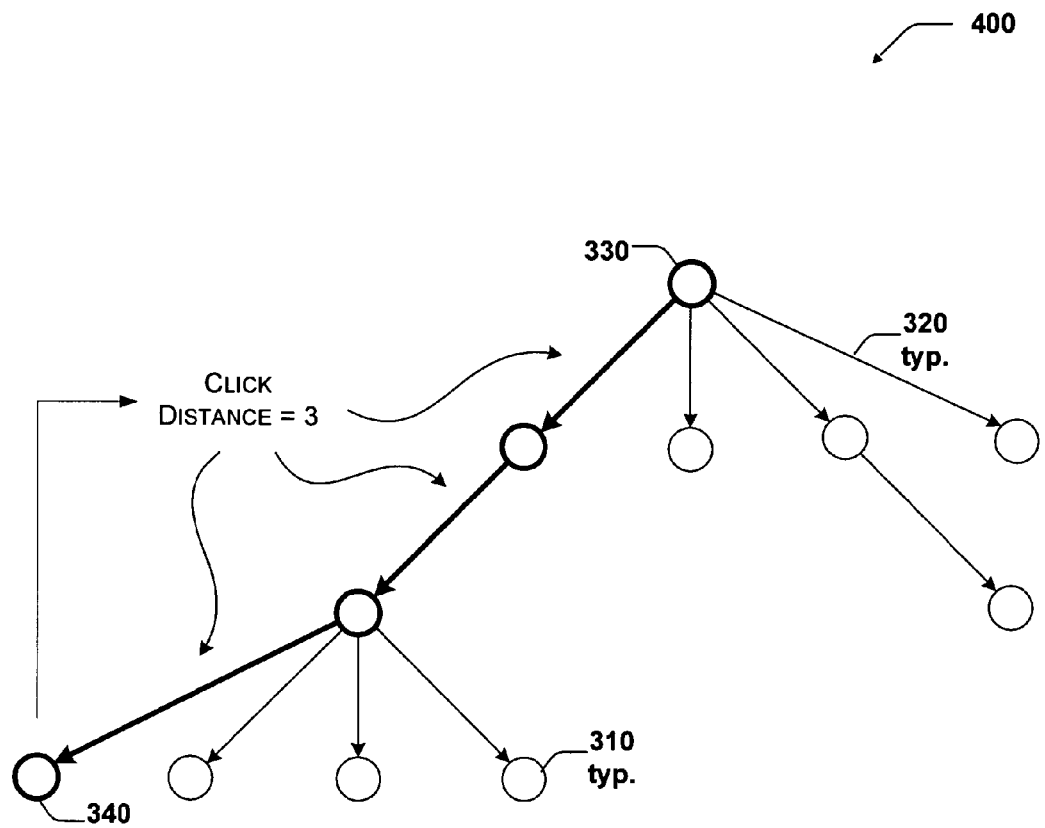
FIG. 4 illustrates an exemplary hierarchical network graph in accordance with the present invention.

FIG. 4 illustrates an exemplary hierarchical network graph in accordance with the present invention. Hierarchical network graph 400 is similar to network graph 300 shown in FIG. 3 in that it also includes nodes (e.g., 410) and links (e.g., 420). However, hierarchical network graph 400 is based on the inherent hierarchy of a structured site or intranet. Accordingly, hierarchical network graph 400 may be conceptualized as a tree structure with branches extending from a root node.

For hierarchical network graph 400, the applicability and calculation of click distance is more recognizable. For example, node 330 corresponds to the highest authority node or root node of the tree. Node 340 therefore has an associated click distance of 3, being 3 clicks or user navigations from the root node. Stated differently, since a user is required to traverse 3 branches of the tree to navigate from node 330 to node 340, the click distance is also 3.

The network graphs represented in FIGS. 3 and 4 are examples of graphs that are constructed in memory during the indexing of the documents for calculating the click distance. Constructing a graph during indexing allows the click distance to be included among the document statistics stored in the index and used for ranking the pages. Example processes for generating the click distance property and using the click distance property in ranking documents are described below in relation to FIGS. 5 and 6.

Figure 5:
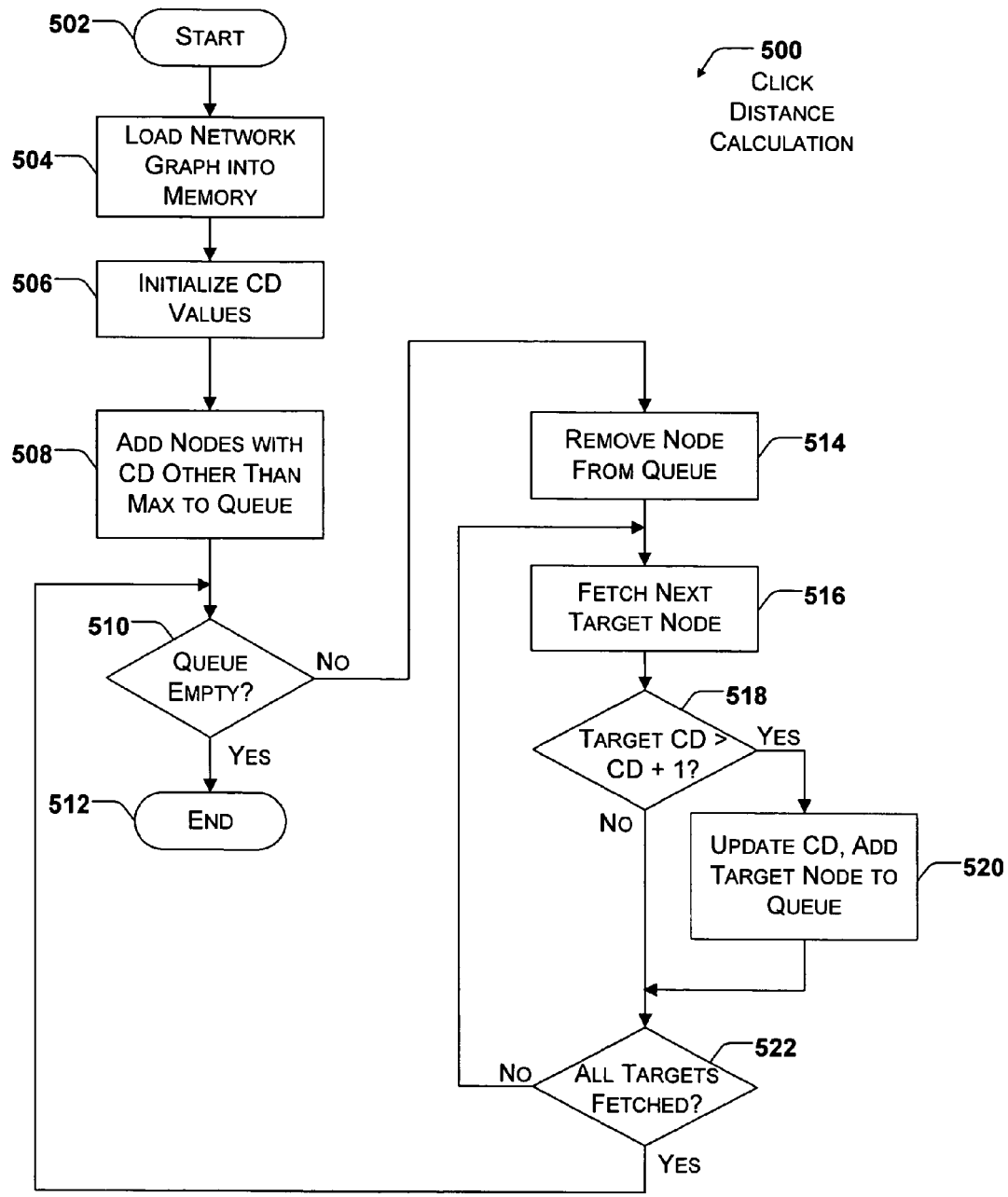
FIG. 5 illustrates a logical flow diagram of an exemplary process for calculating the click distance in accordance with the present invention.

FIG. 5 illustrates a logical flow diagram of an exemplary process for calculating the click distance (CD) in accordance with the present invention. Process 500 starts at block 502 where documents on a distributed network have been indexed and the network graph has been generated. In one embodiment, network graph is generated from data gathered by a process where link and anchor text information is gathered and attributed to specific target documents of the anchor. This process and the concept of anchor text is described more fully in U.S. Pat. No. 7,739,277, entitled: "System and Method for Incorporating Anchor Text into Ranking Search Results", issued Sep. 30, 2004 that is hereby incorporated by reference. Processing continues at block 504.

At block 504, the network graph is loaded into memory. This network graph is the structural representation of the document identification (e.g., document ID) and linking information gathered from the network. Examples of the network graph are shown in FIGS. 3 and 4. The network graph represents the nodes or pages of a site or intranet. Each node has an associated click distance property that has a value or weight. In one embodiment, this click distance property is concatenated onto the end of the document ID. Processing continues at block 506.

At block 506, click distance (CD) values for the nodes are initialized. The highest authority nodes are referred to as assigned nodes. These nodes are assigned a click distance value of 0 (zero). More than one high authority node may be designate for a single network graph. For example, an administrator may rank a set of 100 nodes manually and designate them all as high authority nodes. Additionally, high authority nodes do not need to have a click distance of 0 (zero), any number may be assigned by an administrator. Changing the click distance of the high authority nodes does not alter the remaining algorithm, but simply provides a method for manually designating the importance of a node. For example, an administrator can improve the click distance score of some nodes. In other cases the administrator can decrease the click distance score (by forcing click distance to be higher than computed by the algorithm by default). The click distance for each of the unassigned nodes is initialized to a maximum value. In one embodiment, the maximum value essentially sets the click distance value to infinity. Assigning the infinity value to a node makes it easily recognizable as a node that has not had its click distance calculated. With the initializations of the click distance values complete, processing moves to block 508.

At block 508, the nodes that have an associated click distance other than the maximum value are inserted into a queue. In one example, this step only occurs in a first iteration. The nodes inserted into the queue correspond to the highest authority nodes since their click distance values are set to 0 (zero), a value other than the maximum value. Once the nodes with click distance value other than the maximum are added to the queue, processing continues at decision block 510.

At decision block 510, a determination is made whether the queue is empty. An empty queue signifies that no more nodes need the click distance of their target nodes calculated. If the queue is empty, processing moves to block 512 where process 500 ends. However, if the queue is not empty, processing continues at block 514.

At block 514, a node is removed from the queue. Removing the node from the queue initiates the calculation of the click distances for the target nodes associated with that document. Target nodes correspond to documents that have a link to them from an originating document. In this case, the originating document is the document corresponding to the node removed from the queue. Once this node is removed, processing moves to block 516.

At block 516, the next target node is fetched. The next target node refers the next document among the documents linked to by the originating document. Once the next target node is fetched, processing continues to decision block 518.

At decision block 518, a determination is made whether the click distance associated with the target node is greater than the click distance of the current page plus one (CD+1). In one embodiment, the only way the condition in block 518 is met is when the target node has a click distance of infinity (assuming that the high authority node is set to zero and an administrator has not manually set a click distance). For example, if the current click distance is 1, then CD+1=2. A click distance of 2 is less than infinity and the condition is met. Determining whether the target click distance is greater than the click distance plus one prevents target documents with a lower click distance from being changed. Using the previous example, if the click distance of the target node is 1, and the current click distance is also 1, then the target click distance is not greater than CD+1=2. In this instance, the shorter path to the target node has already been recorded and therefore need not be updated. Accordingly, when the target click distance is not greater than the current click distance plus one, processing advances to decision block 522. However, if the target click distance is greater than the current click distance plus one, processing moves to block 520.

At block 520, the click distance value of the target node is updated and the target node is added to the queue as a node where click distance calculation of its targets needs to be done. The target node is updated with a new click distance value to remove the infinity value and set the nodes calculated click distance value. In one embodiment, the click distance value of the node is set to the current click distance value plus one (CD+1). Processing continues at decision block 522.

At decision block 522, a determination is made whether all the target nodes have been fetched for the current node removed from the queue. If there are target nodes left to fetch for the current node, processing returns to block 516 where the next target node is fetched. However, if all the target nodes corresponding to the current node have been fetched, processing returns to decision block 510 to recheck if the queue is now empty. Again, once the queue is empty, processing moves to block 512, where process 500 ends.

It is possible that not all of the nodes in a network are connected to the initial high authority nodes. Accordingly, in another embodiment of the present invention, the nodes that are not connected to the high authority nodes are assumed to have a low importance and are assigned a click distance that is less than average for the network graph.

Figure 6:
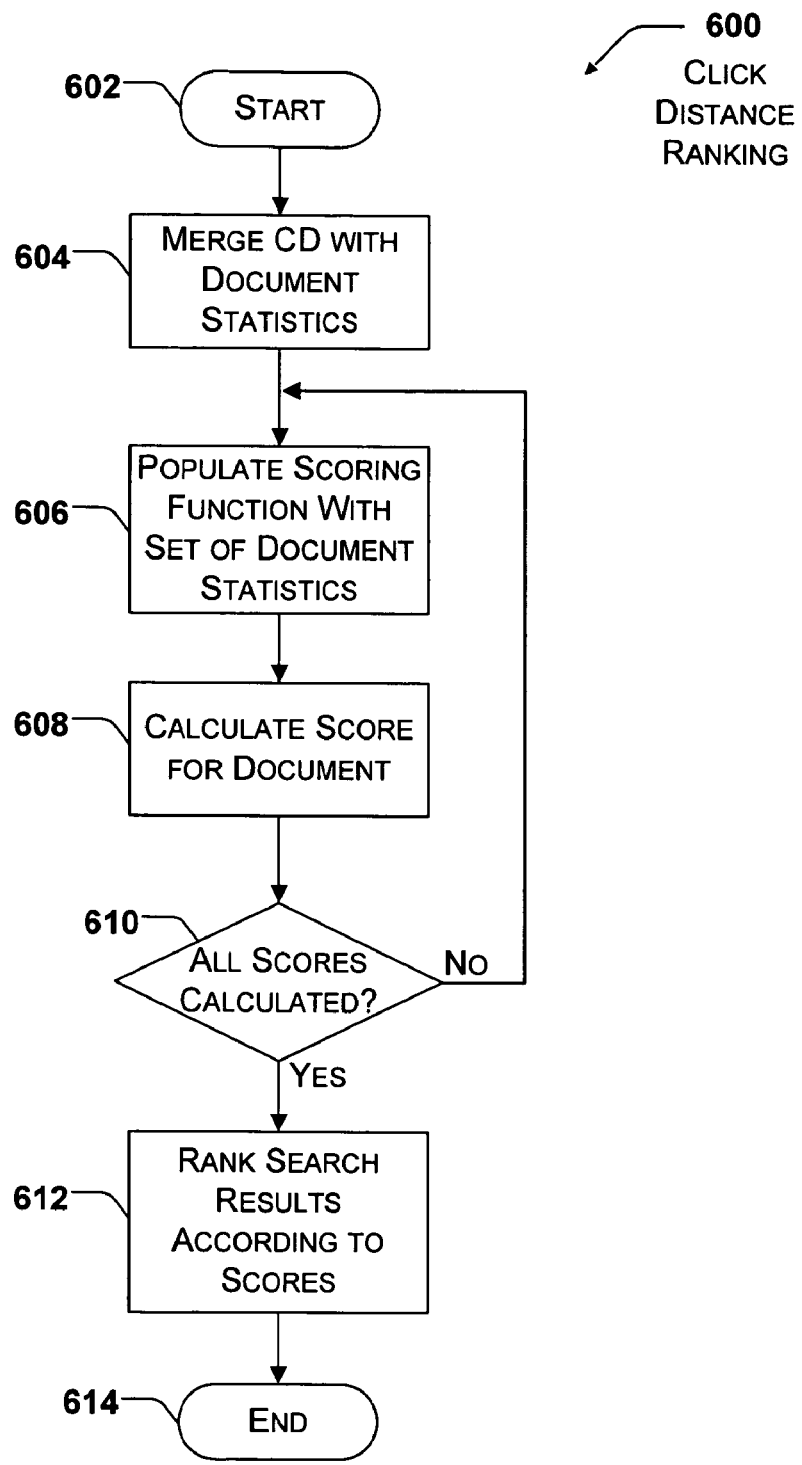
FIG. 6 illustrates a logical flow diagram of an exemplary process for using the click distance in ranking search results in accordance with the present invention.

FIG. 6 illustrates a logical flow diagram of an exemplary process for using the click distance in ranking search results in accordance with the present invention. Process 600 starts at block 602 where a query has been requested and the click distance for each of the documents on the network has been calculated. Processing continues at block 604.

At block 604, the click distance value for each of the documents is merged with the other document statistics (see FIG. 2) in the index. Merging the click distance values with the other document statistics allows for a faster query response time since all the information related to ranking is clustered together. Accordingly, each document listed in the index has an associated click distance value after the merge. Once the merge is complete, processing moves to block 606.

At block 606, a scoring function is populated with the set of document statistics, including the click distance, to calculate a score for a particular document. The click distance provides a query-independent factor to the scoring function. The other portion of the scoring function corresponds to the query-dependent or content-related portion of the scoring function. In one embodiment, the scoring function is a sum of query-dependent (QD) and query-independent (QID) scoring functions:

$$\text{Score}=\text{QD}(doc,query)+\text{QID}(doc) \quad (1)$$

The QD function can be any document scoring function. In one embodiment, the QD scoring function corresponds to the field weighted scoring function described in patent application Ser. No. 10/804,326, entitled "Field Weighting in Text Document Searching", filed on Mar. 18, 2004 and hereby incorporated by reference. As provided by the Ser. No. 10/804,326 patent application the following is a representation of the field weighted scoring function:

$$QD(doc, \text{query}) = \sum \frac{wtf(k_1+1)}{k_1\left((1-b)+b\frac{wdl}{avwdl}\right)+wtf} \times \log\left(\frac{N}{n}\right) \quad (2)$$

Wherein the terms are defined as follows: wtf is the weighted term frequency or sum of term frequencies of a given terms multiplied by weights across all properties; wdl is the weighted document length; avwdl is the average weighted document length; N is the number of documents on the network (i.e., the number of documents crawled); n is the number of documents containing the given query term; and $k_1$ and b are constants. These terms and the equation above are described in detail in the Ser. No. 10/804,326 patent application.

The QID function can be any transformation of click-distance and other document statistics (such as URL depth). In one embodiment this function is as follows:

$$QID(doc) = \sum w_{cd} \frac{k_{cd}}{k_{cd} + \frac{b_{cd}CD + b_{ud}UD}{b_{cd}+b_{ud}}} \quad (3)$$

Wherein the terms for the function are defined as follows: $w_{cd}$ is the weight of the query independent component; $b_{cd}$ is the weight of the click distance; $b_{ud}$ is the weight of the URL depth; CD is the Click Distance; UD is the URL Depth; and $K_{cd}$ is the click distance saturation constant. The weighted terms ($w_{cd}$, $b_{cd}$, and $b_{ud}$) assist in defining the importance of each of their related terms and ultimately the shape of the scoring functions. The URL depth (UD) is an addition to the query-independent component to smooth the effect of the click distance on the scoring function. In some cases, a document that is not very important (i.e., has a large URL depth) may have a short click distance. The URL depth counts the number of slashes in a document's URL. For example, www.example.com\d1\d2\d3\d4.htm includes four slashes and would therefore have a URL depth of 4. This document however, may have a link directly from the main page www.example.com giving it a click distance of 1. Including the URL depth term in function (3) and weighting it against the click distance, compensates for the high click distance score to more accurately reflect the page's rank within the hierarchy. Depending on the network, a URL depth of 3 or more may be considered a deep link. For this embodiment, the present invention adds the two functions of (2) and (3) to receive the scoring function (Score), such that the new scoring function becomes:

$$\text{Score} = \sum \frac{wtf(k_1+1)}{k_1\left((1-b)+b\frac{wdl}{avwdl}\right)+wtf} \times \log\left(\frac{N}{n}\right) + \tag{4}$$

$$w_{cd} \frac{k_{cd}}{k_{cd} + \frac{b_{cd}CD + b_{ud}UD}{b_{cd}+b_{ud}}}$$

In other embodiments, the URL depth may be removed from the scoring function or other factors may be added to the scoring function to improve the accuracy of either the query-dependent or query-independent component. Furthermore, the query-independent component may be incorporated into other ranking functions not shown for improvement of the ranking results without departing from the spirit or scope of the invention. Once scoring function (4) is populated with the document statistics for a particular document, processing proceeds to block 608.

At block 608, the scoring function is executed and the relevance score for the document is calculated. Once the relevance score is calculated, it is stored in memory and associated with that particular document. Processing then moves to decision block 610.

At decision block 610, a determination is made whether relevance scores for all the documents have been calculated according to scoring function (4). The scores may be calculated serially as shown or in parallel. If all the scores have not been calculated, processing returns to block 606 where the scoring function is populated with the next set of document statistics. However, if the all the scores have been calculated, processing continues to block 612.

At block 612, the search results of the query are ranked according to their associated scores. The scores now take into account the click distance and URL depth of each of the documents. Accordingly, the ranking of the documents has been refined so that documents higher in the hierarchy of an intranet or site are ranked higher the other documents where all other factors are the same. Once the search results are ranked, processing proceeds to block 614, where process 600 ends.

After process 600 is complete, the ranked documents may be returned to the user by the various operations associated with the transmission and display of results by a search engine. The documents corresponding to the higher precision results may then be selected and viewed at the user' discretion.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for ranking search results, the method comprising:
   storing document and link information for documents on a network;
   generating a representation of the network from the document and link information, wherein the representation of the network includes nodes that represent the documents, the nodes including at least two high authority nodes and other nodes;
   assigning to each high authority node a click distance value set by an administrator;
   setting initial click distance values of the other nodes to a predetermined value;
   computing click distance values for the other nodes with a computing device, the click distance values for each of the other nodes being a number of the links traversed on a shortest path to a closest of the high authority nodes; and
   ranking search results using the click distance values of the high authority nodes and the other nodes as a query-independent relevance measure.

2. The method of claim 1, wherein the predetermined value is a maximum value.

3. The method of claim 1, further comprising storing the ranked search results in memory, wherein the ranked search results comprise a list of at least some of the documents arranged in a descending order of relevance.

4. The method of claim 1, further comprising merging the click distance values with other statistics before ranking the search results.

5. The method of claim 4, wherein a scoring function is populated with the computed click distance values and the other statistics for producing a score by which the documents are ranked.

6. The method of claim 1, wherein ranking search results using the click distance values of the high authority nodes and the other nodes as a query-independent relevance measure further comprises using a component corresponding to the click distance in a scoring function for determining a relevance score for each of the documents.

7. The method of claim 6, wherein the relevance score is offset by a Uniform Resource Locator depth property that smoothes the effect of the click distance on the relevance score.

8. The method of claim 1, wherein generating the representation of the network further comprises generating a representation of the network wherein more than two nodes within the representation of the network are designated as a high authority node.

9. The method of claim 1, further comprising receiving an input from a user to manually change one of the click distance values after the one of the click distance values is calculated.

10. The method of claim 1, further comprising ranking the documents according to a scoring function (score) that is determined according to at least: the computed click distance value (CD), a weight of a query-independent component ($w_{cd}$), a weight of the click distance ($b_{cd}$), a weight of a URL depth ($b_{ud}$), the URL depth (UD), and a click distance saturation constant ($K_{cd}$).

11. The method of claim 1, further comprising ranking the documents according to a scoring function (score) that is determined according to at least: the computed click distance value (CD), a weighted term frequency (wtf), a weighted document length (wdl), an average weighted document length (avwdl), a number of documents on the network (N); a number of documents containing a query term (n), a weight of a query-independent component ($w_{cd}$), a weight of the click distance ($b_{cd}$), a weight of a URL depth ($b_{ud}$), the URL depth (UD), a click distance saturation constant ($K_{cd}$), and other constant ($k_1$, b).

12. The method of claim 11, wherein the scoring function (score) is given by:

$$score = \sum \frac{wtf(k_1+1)}{k_1\left((1-b)+b\frac{wdl}{avwdl}\right)+wtf} \times \log\left(\frac{N}{n}\right) + w_{cd}\frac{k_{cd}}{k_{cd}+\frac{b_{cd}+CD+b_{ud}UD}{b_{cd}+b_{ud}}}.$$

13. A system for ranking search results, the system comprising a computing device operating a search engine thereon, the search engine including computer-executable instructions, which when executed by the computing device cause the computing device to:
    record document and link information for documents on a network;
    generate a representation of the network from the document and link information, wherein the representation of the network includes nodes that represent the documents, the nodes including at least two high authority nodes and other nodes;
    assign to each high authority node a click distance value set by an administrator;
    set initial click distance values of the other nodes to a predetermined value;
    compute click distance values for the other nodes, the click distance values for each of the other nodes being a number of the links traversed on a shortest path to a closest of the high authority nodes; and
    rank search results using the click distance values of the high authority nodes and the other nodes as a query-independent relevance measure.

14. The system of claim 13, wherein generating a representation of the network further comprises generating a network graph and storing the network graph into memory.

15. The system of claim 13, wherein the computing device is further caused to merge the click distance values with other statistics before ranking the search results.

16. The system of claim 15, wherein a scoring function is populated with the computed click distance values and the other ranking values for producing a score by which the documents are ranked.

17. The system of claim 13, wherein ranking search results using the click distance values of the high authority nodes and the other nodes as a query-independent relevance measure further comprises using a component corresponding to the click distance in a scoring function for determining a relevance score for each of the documents.

18. A computer-readable storage medium comprising computer-executable instructions, which when executed by a computing device cause the computing device to:
    record document and link information for documents on a network;
    generate a representation of the network from the document and link information, wherein the representation of the network includes nodes that represent the documents, the nodes including at least two high authority nodes and other nodes;
    assign to each high authority node a click distance value set by an administrator;
    set initial click distance values of the other nodes to a predetermined value;
    compute click distance values for the other nodes with a computing device, the click distance values for each of the other nodes being a number of the links traversed on a shortest path to a closest of the high authority nodes; and
    rank search results using the click distance values of the high authority nodes and the other nodes as a query-independent relevance measure.

* * * * *